US005701399A

United States Patent [19]
Lee et al.

[11] Patent Number: 5,701,399
[45] Date of Patent: Dec. 23, 1997

[54] INTEGRATION OF CASE-BASED SEARCH ENGINE INTO HELP DATABASE

[75] Inventors: S. Daniel Lee, San Gabriel, Calif.; Trung D. Nguyen, Tomball; Mary P. Czerwinski, The Woodlands, both of Tex.

[73] Assignee: Inference Corporation, El Segundo, Calif.

[21] Appl. No.: 771,311

[22] Filed: Dec. 20, 1996

Related U.S. Application Data

[63] Continuation of Ser. No. 75,055, Jun. 9, 1993, abandoned.

[51] Int. Cl.$^6$ ................................................. G06F 15/18
[52] U.S. Cl. ....................................... 395/51; 395/12
[58] Field of Search ........................................ 395/51

[56] References Cited

U.S. PATENT DOCUMENTS

| | | | |
|---|---|---|---|
| 4,648,862 | 3/1987 | Johnson et al. | 395/157 |
| 5,103,498 | 4/1992 | Lanier et al. | 395/68 |
| 5,122,972 | 6/1992 | Richards et al. | 395/157 |
| 5,255,386 | 10/1993 | Prager | 395/600 |
| 5,287,448 | 2/1994 | Nicol et al. | 395/155 |

FOREIGN PATENT DOCUMENTS

| | | | |
|---|---|---|---|
| 0233071 | 6/1986 | European Pat. Off. | G05B 13/02 |

OTHER PUBLICATIONS

Handelman, et al.; "Ingegrating Neural Networks and Knowledge-Based Systems for Intelligent Robotic Control," in IEEE Control Systems Magazine (Apr. 30, 1990), pp. 77–87.

Aleksander, et al; "The Cognitive Challenge for Neural Architectures," in International Neural Network Conference (Jul. 9–13, 1990), pp. 627–630.

Isik, et al.; "Pilot Level of a Hierarchical Controller for an Unmanned Mobile Robot," in 4:3 IEEE Journal of Robotics and Automation (Jun. 1988), pp. 241–255.

MacNiel, "Capturing Multimedia Design Knowledge Using Tyro, The Constraint Based Designer's Apprentice", in Image Handling and Reproduction Systems Integration (1991), pp. 94–102.

Lee, "Case-based reasoning for robotic assembly cell diagnosis", in Expert Robots for Industrial Use (1988), pp. 241–246.

Integrating Case-Based Reasoning with Genetic Algorithms; Computational Intelligence, III; Oppacher et al; Conference Date Sep. 24–28, 1990; pp. 103–114.

Combining Case-Based and Rule Based Reasoning: A Heuristic Approach; IJCAI 1989; Rissland et al; vol. 1; pp. 524–530.

Explanation Based Indexing of Cases; Proc. of AAAi–88; Baretta et al; Aug. 1988.

An Interface for Case-Based Knowledge Acquisition; Proc. Workshop on Case-Based Reasoning; Riesbeck; May 10–13, 1988; pp. 312–326.

A Generalized Case Based Reasoning System for Personnel Performance Evaluation; Proc. 24th Annual Hawaii Inter. Conf. on System Sciences; Chi et al; Jan. 8–11, 1991; pp. 82–89.

Credit Assignment and the Problem of Competing Factors in Case-Based Reasoning; Proc. Workshop on Case-Based Reasoning; Rissland et al; May 10–13, 1988; pp. 327–344.

(List continued on next page.)

*Primary Examiner*—Robert W. Downs
*Attorney, Agent, or Firm*—D'Alessandro & Ritchie

[57] ABSTRACT

A system in which a case-based search engine is integrated into a "help" database. The help database may be organized in a predetermined manner and converted by a computer program into a case-based format. An operator of a "help" program (e.g., a user who desires on-line help) may request a case-based search of the case-base using case-based methods. The case-based search provides a set of likely cases, i.e., help topics, from among which the operator may select the next help topic to view. The system may also present matched objects in response to the query, may respond to iterative refinement of the query (in similar manner to known iterative case-based methods) and may order matched objects by quality of match.

10 Claims, 1 Drawing Sheet

OTHER PUBLICATIONS

Case Based Reasoning for Continuous Control; Proc. Workshop on Case-Based Reasoning; Kopeikina et al; May 10-13, 1988; pp. 250-259.

Some Experiments with Case-Based Search; Proc. Workshop on Case-Based Reasoning; Bradtke et al; May 10-13, 1988; pp. 80-93.

Clavier: A Case Based Autoclave Loading Advisor; David Hinkle; Mar. 9, 1990.

Using a Case Memory to Integrate Case-Based and Causal Reasoning; Case-Based Reasoning Workshop; Phyliss Koton; Aug. 23, 1988; pp. 74-81.

Breuker, et al, "A shell for Intelligent Help systems," IJCAI 1987, 1987, 167-173.

Frakes, et al, "Using expert system components to add intelligent help and guidance to software tools," Information and Software Technology, vol. 31, No. 7, Sep. 1989, 366-370.

Prager, et al, "Reason: An intelligent user assistant for interactive environments," IBM Systems Journal, vol. 29, No. 1, 1990, 141-164.

Shafer, D., "CBR Express: Getting Down to Cases," PC AI, Jul./Aug. 1991, 42-45.

Simoudis, E., "Using Case-Based Retrieval for Customer Technical Support," IEEE Expert, Oct. 1992, 7-12.

Francis, B., "Help for the help desk," Datamation, Apr. 1, 1993, 59(2).

Cummings, S., "Help-desk hybrids: big on complexity and features," Lan Times, Apr. 5, 1993, p. 72(3).

INTEGRATION OF CASE-BASED SEARCH ENGINE INTO HELP DATABASE

CROSS-REFERENCE TO RELATED APPLICATION

This is a file-wrapper continuation or patent application Ser. No. 08/075,055, filed Jun. 9, 1993, now abandoned.

BACKGROUND OF THE INVENTION

1. Field of the Invention

This invention relates to integrating a case-based search engine into a "help" database.

2. Description of Related Art

On-line "help" databases are a well known solution to the desire of computer users for ready access to information about the computer programs and system they are using. However, as programs and systems become more complex, the number of help topics grows, and users may find it difficult to select one (or a few) particular topics which are best related to their area of inquiry. Accordingly, there is a need for "help" databases to be searchable by techniques which are more closely related to the ability of the user to describe the preferred area of inquiry.

SUMMARY OF THE INVENTION

The invention provides a system in which a case-based search engine is integrated into a "help" database. In a preferred embodiment, the help database may be organized in a predetermined manner and converted by a computer program into a case-based format. An operator of a "help" program (e.g., a user who desires on-line help) may request a case-based search of the case-base using case-based methods. The case-based search provides a set of likely cases, i.e., help topics, from among which the operator may select the next help topic to view. In a preferred embodiment, the system may also present matched objects in response to the query, may respond to iterative refinement of the query (in similar manner to known iterative case-based methods) and may order matched objects by quality of match.

BRIEF DESCRIPTION OF THE DRAWINGS

The FIGURE shows a block diagram of a database explorer and filter system.

DESCRIPTION OF THE PREFERRED EMBODIMENT

Figure 1:
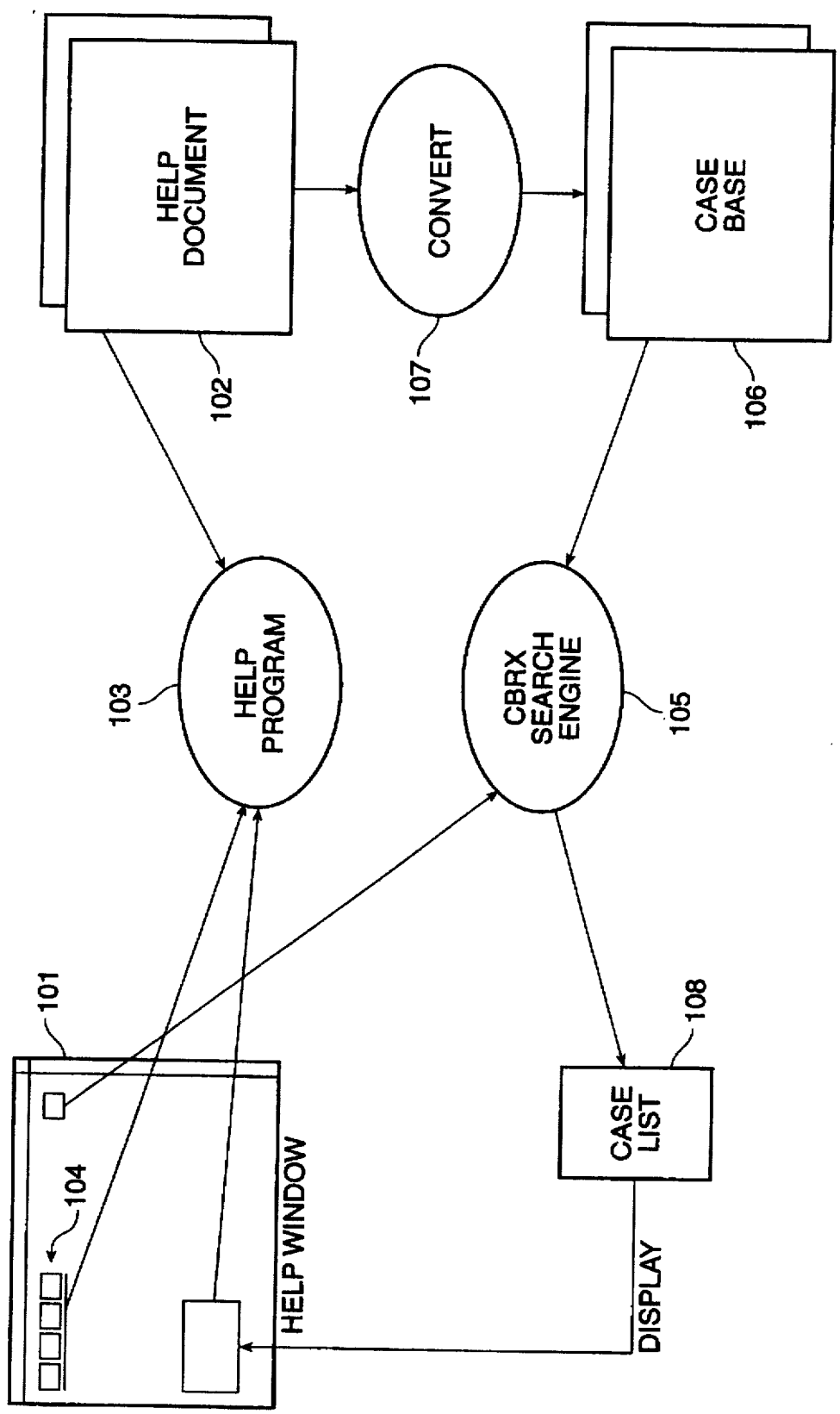

In a preferred embodiment, the invention may operate in conjunction with a computing system, including a processor and a memory, generally configured as is well known in the art; the memory may include primary memory for stored programs and for data and secondary memory for extensive storage of large numbers of objects.

The FIGURE shows a block diagram of a system in which a case-based search engine is integrated with a help database.

In a preferred embodiment, a help window 101 is presented for displaying help topics (segments of a help database 102) to an operator. A help program 103 receives inputs from the operator in response to a set of input commands, possibly implemented as menu items or command buttons 104. (Menu items and command buttons are well known in the art.) The help program 103 receives text, graphics and possibly other data from the help database 102 (also known as a help document") and displays that information in the help window 101 for perusal by the operator.

An additional menu item or command button 104 is presented in the help window 101 for the operator to direct that a case-based search be made. (As is well known in the art, the additional menu item or command button 104 might instead be implemented as a submenu item, special key sequence, or other way to direct that a procedure be executed.) A case-based search engine 105 received inputs from the operator, implemented as the additional menu item or command button 104. The case-based search engine 105 also receives search parameter inputs, such as a natural language text description of the desired help topic, any other parameters (e.g., whether the operator is searching for information on a program command or menu item). The case-based search engine 105 conducts a case-based search of a case base 106 using known case-based search techniques.

In a preferred embodiment, the case base 106 is constructed from the help database 102 by a conversion program 107, which converts data from a first predetermined format in which the help database 102 is stored to a second predetermined format in which the case-base 106 is stored. In a preferred embodiment, the conversion program 107 may copy data from the Microsoft "help document" format (description available from Microsoft Corporation in Redmond, Wash.) to an export-import format for the "CBR Express" product (available from Inference Corporation in El Segundo, Calif.).

The case-based search engine 105 generates a case list 108 of cases (i.e., help topics) which match the natural language text description of the desired topic and the other data entered by the operator. The operator may then refine the query using known case-based query refinement techniques. The case list 108, as possibly refined, may be displayed in the help window 101 for the operator to select a single case (i.e., help topic) for display. Alternatively, the help topic with the best match value could be automatically selected.

The papers, "COMPAQ QuickSource: Providing the Consumer with the Power of Artificial Intelligence," and "CBR2, CBR fixpress for Windows Users Guide, Chapter 5, Import and Export Utilities," both available from Inference Corporation of Novato, Calif, provide detailed information regarding the implementation of elements of a preferred embodiment of the invention and are hereby incorporated by reference as if fully set forth herein.

Alternative Embodiments

While preferred embodiments are disclosed herein, many variations are possible which remain within the concept and scope of the invention, and these variations would become clear to one of ordinary skill in the art after perusal of the specification, drawings and claims herein.

I claim:

1. A system for presenting information to an operator, said system comprising:

an input interface disposed for a user to enter a plurality of help commands;

a help database having a plurality of help topics and comprising text thereof;

a help program coupled to said input interface and to said help database, said help program comprising means for selecting help topics from said help database in response to said help commands entered by said user using said input device;

a conversation program for converting and importing said help topics and text thereof from a help document format to a case base format;

a case base having a plurality of cases created by importing said plurality of help topics and text thereof in said case format from said conversion program, said plurality of cases corresponding to said plurality of help topics and comprising text thereof;

a case-based search engine coupled to said input interface and to said case base, said case-based search engine comprising means for selecting at least one matching case in response to said help commands entered by said user using said input interface, wherein said case-based search engine is coupled to said help program and is responsive to a command from said help program;

means for coupling a set of search parameter inputs to said case-based search engine, wherein said search parameter inputs comprises a natural language text description of a desired help topic;

means for selecting a single help topic in response to said at least one matching case; and means for outputting said single help topic.

2. A system as in claim 1, wherein said input device comprises a help window.

3. A system as in claim 1, wherein said help database comprises text, graphics, or sound.

4. A system as in claim 1, wherein said case base comprises one case for each said help topic.

5. A system as in claim 1, wherein said means for selecting a single help topic comprises means for displaying a plurality of possible help topics;

means for receiving an indication of one of said plurality of possible help topics.

6. A system as in claim 1, wherein said means for selecting a single help topic comprises means for associating a value with each one of a plurality of possible help topics;

means for comparing said value for at least two of said plurality of possible help topics;

means for choosing one of said plurality of possible help topics in response to said value.

7. A system as in claim 6, wherein said value is quality of match.

8. A system as in claim 1, wherein said means for coupling comprises a command to said help program 9. A system as in claim 1, comprising means for coupling a set of query refinement inputs to said case-based search engine.

10. A system as in claim 9, wherein said means for coupling comprises a command to said help program.

* * * * *